J. H. FEDELER.

EVAPORATING APPARATUS.

APPLICATION FILED JULY 11, 1911. RENEWED NOV. 6, 1917.

1,278,127. Patented Sept. 10, 1918.

Witnesses:

John H. Fedeler Inventor

By his Attorneys Gifford & Bull

J. H. FEDELER.

EVAPORATING APPARATUS.

APPLICATION FILED JULY 11, 1911. RENEWED NOV. 6, 1917.

1,278,127. Patented Sept. 10, 1918.

Witnesses:

[signatures]

John H. Fedeler Inventor

By his Attorneys Gifford & Bull

UNITED STATES PATENT OFFICE.

JOHN H. FEDELER, OF NEW YORK, N. Y.

EVAPORATING APPARATUS.

1,278,127. Specification of Letters Patent. Patented Sept. 10, 1918.

Application filed July 11, 1911, Serial No. 637,961. Renewed November 6, 1917. Serial No. 200,645.

*To all whom it may concern:*

Be it known that I, JOHN H. FEDELER, a citizen of the United States, and a resident of New York city, borough of Manhattan, in the county of New York and State of New York, have invented certain new and useful Improvements in Evaporating Apparatus, of which the following is a specification.

The object of the invention is to provide comparatively simple, and highly effective apparatus for the evaporation of liquids containing solids so that the latter may be obtained in dry form, and to provide means whereby the liquid is atomized or vaporized and maintained in this condition until the solids contained therein may be effectually dried by currents of dry air and reduced to powdered form.

The invention consists in the improvements to be fully described hereinafter, and the novelty of which will be particularly pointed out and distinctly claimed.

I have fully and clearly illustrated my invention in the accompanying drawings to be taken as a part of this specification, and wherein, Figure 1 is a view in side elevation partly in longitudinal vertical section of the apparatus embodying my present invention, the section being taken on the line 1, 1 of Fig. 2;

Figures 1, 4:
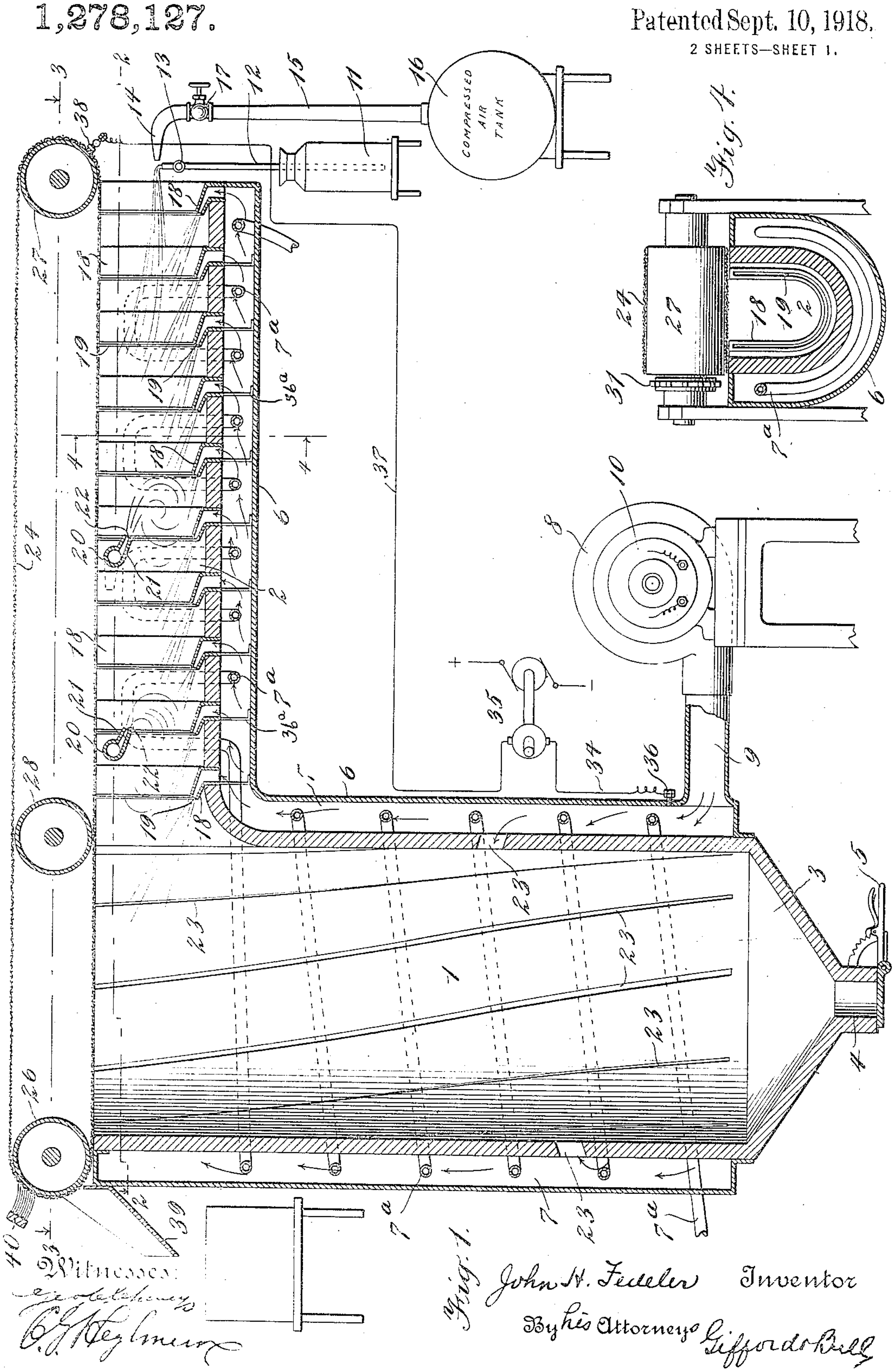
Fig. 4 is a section on the line 4, 4 of Fig. 1.
Figures 2, 3:
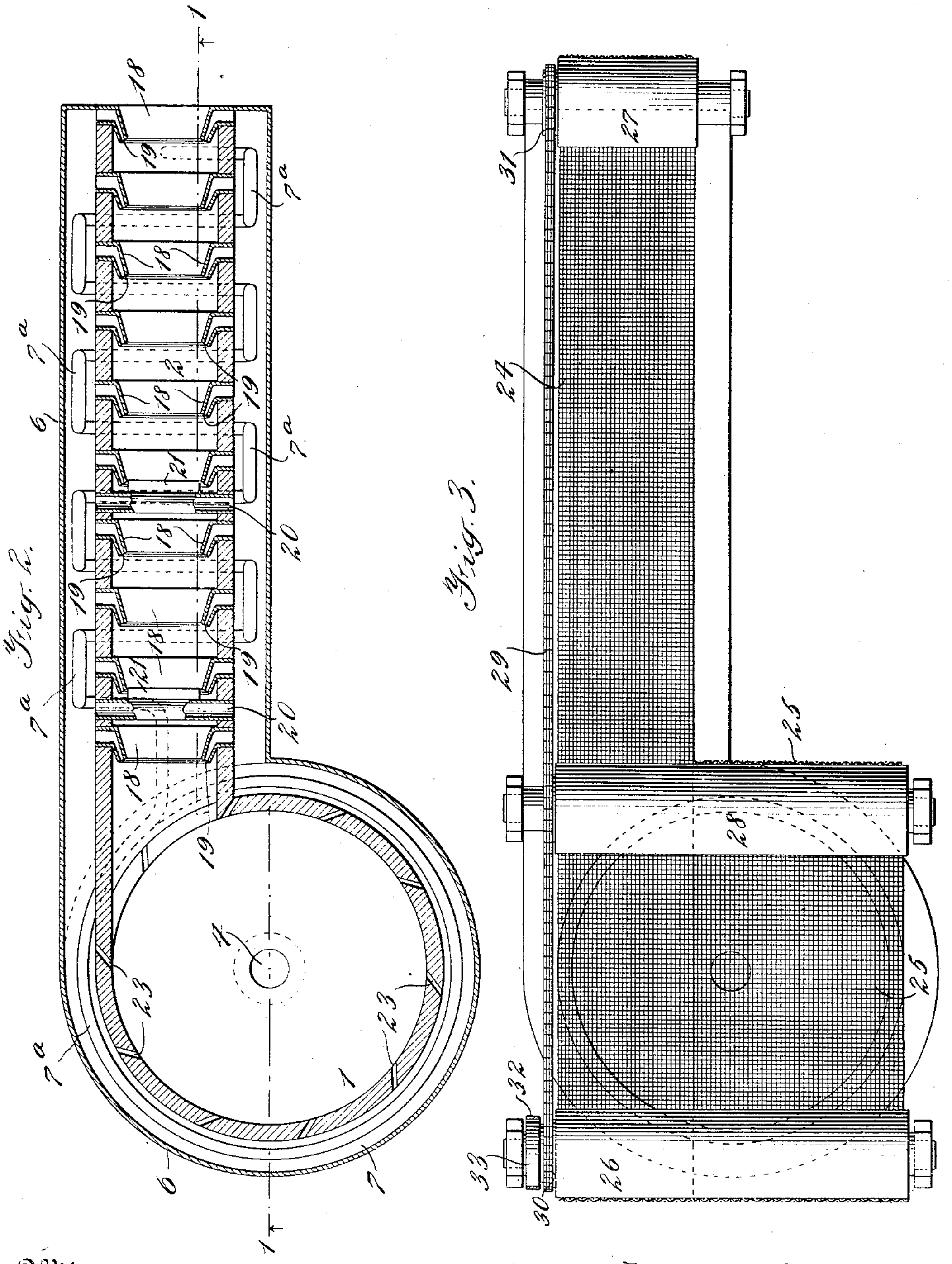
Fig. 2 is a section through a portion of the apparatus taken on the line 2, 2 of Fig. 1.
Fig. 3 is a section taken on the line 3, 3 of Fig. 1.

Referring to the drawings by characters of reference, 1 designates a cylindrical chamber or stack, and 2 designates a horizontally disposed chamber, preferably in the form of a trough, which at one end opens into the upper portion of one side of the chamber as clearly shown in Figs. 1 and 2. The chamber 1 is of any dimensions which will suit it for the purpose for which it is employed, as is the case also with the chamber 2. The chamber is provided at its lower end with a conical floor or hopper bottom 3 having an outlet neck or spout 4 controlled by a hand-operated valve 5, by means of which the contents of the chamber 1 may be withdrawn when desired as hereinafter described. The cylindrical portion of the chamber 1 and the bottom and sides of the trough 2 are surrounded by a jacket 6, leaving an air space 7 which may be supplied with dry heated air from any suitable source, as for instance a blower 8 connected to the jacket or shell by a trunk 9, said blower being driven by any suitable motor, as for instance an electric motor shown at 10. The air in the space 7 may be heated by any suitable means, as for instance a steam pipe $7^a$ coiled about the chamber 1, and looped back and forth beneath the trough 2.

At the end of the trough opposite to that which is connected with the upper end of the chamber or stack 1 is suitable means for vaporizing or atomizing the liquid to be separated, and directing the vapor or atoms into said end of the trough. This means may take any suitable form, but I have shown it as consisting of a container 11 adapted to hold the liquid to be evaporated, from which extends an outlet pipe 12, the lower end of which enters the liquid in the container, and the upper open end of which terminates opposite the opening to the end of the trough. A suitable valve 13 may be interposed in this pipe to regulate the flow therethrough. 14 designates an air nozzle arranged adjacent the open end of the pipe 12 so that a blast of air from the nozzle will operate at the end of the pipe 12 to draw the liquid from the container 11 and atomize said liquid. The air nozzle may be supplied with a current of air through a pipe 15 connected with a compressed air tank 16, and a valve 17 may be interposed to said pipe to regulate the blast from the nozzle.

Suitable means is provided for admitting blasts of dry heated air to the interior of the trough 2 for the purpose of evaporating the liquid being treated and drying the particles separated from the liquid, and this means may also include facilities for impelling the dried particles toward the stack. Preferably the means just stated consists of a plurality of nozzles which communicate with the air chamber between the trough and the jacket 6, the nozzles having outlets arranged to direct the blasts upwardly and lengthwise of the trough toward the stack. In the present form of the invention these nozzles consist of semi-circular conduits 18 located in the sides and bottom walls of the trough and formed with outlet orifices or slits 19 throughout their length, the outlets being so directed that the air flowing from the same is thrown upwardly and lengthwise of the trough obliquely across the stream of atomized liquid toward chamber 1. By the construction of the nozzle shown and described a film or sheet of air is thrown from each nozzle from the bottom and sides of the trough so that the stream of atomized liquid containing the solids to be recovered will have to pass through the film of air formed by each nozzle so that the atomized stream will be caught and forced to travel through substantially, the center of the trough without coming in contact with the sides and bottom of the latter. This arrangement of the nozzle not only serves to evaporate the atomized liquid and dry the solids, but to impel the solids toward the chamber 1.

The trough may be provided at its upper portions with downwardly directed nozzles which serve to throw the atomized liquid down to a point where it will be most effectively acted upon by the air issuing from the nozzles first described. It will be understood that these additional nozzles also assist materially in drying of the atomized liquid. The nozzles just referred to consist preferably of pipes 20 set transversely of the trough and each having a transverse mouth piece 21 having a slit 22 from which the air issues in a flat stream or film, said pipes being adjustable by rotation on their longitudinal axis so that the direction of the streams emitted from the mouth pieces can be regulated to suit the requirements.

The chamber or stack 1 heretofore referred to is also formed with means for feeding dry heated air to the interior thereof so that the product resulting from the operation within the trough 2 will be subjected to an additional drying process in said chamber 1. The means for injecting the dry air into the chamber 1 preferably consists of long slots 23 extending lengthwise of the wall of the chamber and directed so as to force the air flowing therefrom to flow at a tangent to a circle, the center of which is the center of the chamber 1. These slots are not perpendicular, but are slightly inclined as shown so that particles floating on the air are gradually forced to follow the path of a screw, the pitch of which is determined by the incline of said slots.

As shown in the drawings the top of the chamber 1 and the chamber 2 are left open, and over the same travel endless belts of wire netting, there being a long belt 24 arranged to travel over and lengthwise of the chamber or trough 2, and a part of the upper end of the chamber, and a short section 25 to cover the remaining part of the chamber 1 not covered by the said long belt. Any suitable means may be employed for supporting and moving the belts, as for instance a long and a short roller 26, 27 respectively over which passes the long belt referred to, and an intermediate long roller 28 over which, together with the first mentioned long roller, passes the short belt. The two outermost rollers can be connected by an endless chain 29 running over sprockets 30, 31 on the shafts of the said rollers to cause them to move in synchronism, the rollers being driven from a belt 32 engaging a pulley wheel 33 on the shaft of the long roller as shown in Fig. 3.

During the drying operation some of the particles separated from the liquid may have a tendency to be drawn off by the air passing through the top of the trough and the chamber, and the screens referred to serve to intercept these particles which might otherwise be lost. To add to the efficiency the inlet nozzles 18 in the trough may be connected to one pole of a source of static electricity as by a conductor 34 leading from a static machine 35 and connected to the jacket as shown at 36, the latter being connected to the nozzles by connectors $36^a$, the other pole of the static machine being connected by a conductor 37 with a brush 38 contacting the long wire belt. By this arrangement the small particles are charged and adhere to the netting and are carried by the same to a discharge trough 39 into which they are thrown by a brush 40 engaging the wire netting at the long outermost roller, the particles caught in the trough 39 being turned into a suitable receiver.

Having now described the construction and arrangement of the apparatus illustrating one embodiment of my invention, I will proceed to briefly set forth the operation of the invention as described.

The fan blower, the static machine, and the endless wire belt having been set in operation, the valve in the pipe 15 is regulated to atomize the liquid and throw the same into the open end of the trough 2. Having entered the end of the trough the atomized liquid is caught up and carried along toward the chamber 1 by the air from the nozzles in the walls of the trough, the liquid being evaporated and passing off with the air through the wire netting over the trough and the particles more or less dried being blown toward the chamber. Any of the particles which may be thrown up against the underside of the netting will be charged so as to adhere thereto and be carried lengthwise of the trough and across the chamber to the discharge trough described, so that practically all the solids from the liquid which is atomized are either carried to the top of the chamber 1 or thrown out at the discharge trough, so that there is little or no loss of the solids sought to be recovered.

Thus solid particles which are thrown into the open upper end of the chamber 1 are caught by the air blasts from the slits in the walls of the chamber so that said particles are forced to follow the path of the screw and are thrown around and around in the chamber until they are thoroughly dried and deposited at the bottom of the chamber in the hopper where they may be withdrawn by opening the hand-operated valve.

What I claim and desire to secure by Letters Patent of the United States is:—

1. In an evaporating apparatus, a chamber, means for admitting a stream of atomized liquid into said chamber, and means for throwing streams of air into the path of said stream at a plurality of points lengthwise thereof and in a direction substantially parallel therewith.

2. In an evaporating apparatus, a chamber, means for admitting a stream of atomized liquid into said chamber and means for throwing streams of air into the path of said stream at a plurality of points lengthwise thereof and in substantially the same direction as that of said stream.

3. In an evaporating apparatus, a chamber, means for admitting a stream of atomized liquid into said chamber, and a plurality of nozzles for throwing streams of air into the path of said stream at a plurality of points lengthwise thereof, said nozzles being directed to throw their streams lengthwise of the stream of atomized liquid to propel the latter and the solids through the chamber.

4. In an evaporating apparatus, an elongated chamber, a plurality of nozzles arranged lengthwise of the chamber, and means for throwing a stream of atomized liquid lengthwise of the chamber.

5. In an evaporating apparatus, an elongated chamber, a plurality of nozzles arranged lengthwise of the chamber, and means for throwing a stream of atomized liquid lengthwise of the chamber, a receiving chamber to receive the products from the elongated chamber, and air inlets through the wall of the receiving chamber.

6. In an evaporating apparatus, an elongated chamber, a plurality of nozzles arranged lengthwise of the chamber, and means for throwing a stream of atomized liquid lengthwise of the chamber, a receiving chamber to receive the products from the elongated chamber, and air inlets through the wall of the receiving chamber, and extending longitudinally of the latter.

7. In an evaporating apparatus, an elongated chamber, a plurality of nozzles arranged lengthwise of the chamber, and means for throwing a stream of atomized liquid lengthwise of the chamber, a receiving chamber to receive the products from the elongated chamber, and air inlets through the wall of the receiving chamber, and constructed to deliver tangentially to a circle the center of which is the longitudinal center of the receiving chamber.

8. In an evaporating apparatus, an elongated chamber, a plurality of nozzles arranged lengthwise of the chamber, and means for throwing a stream of atomized liquid lengthwise of the chamber, a receiving chamber to receive the products from the elongated chamber, and air inlets through the wall of the receiving chamber, and constructed to deliver tangentially to a circle the center of which is the longitudinal center of the receiving chamber, said inlets being inclined lengthwise.

9. In an evaporating apparatus, a chamber, a jacket about the same, means for introducing a stream of atomized liquid to the chamber, and a plurality of nozzles arranged to deliver streams of air at different points in the length of said stream, and in a direction substantially parallel therewith, said nozzles communicating with the jacket.

10. In an evaporating apparatus, a trough-shaped chamber, a jacket about the same, means for introducing a stream of atomized liquid to the chamber, and a plurality of nozzles arranged to deliver at different points in the length of said stream, said nozzles communicating with the jacket.

11. In an evaporating apparatus, an elongated chamber, means for introducing an atomized fluid into the chamber, and means for propelling the atomized fluid lengthwise of the chamber consisting of a plurality of air discharging nozzles arranged lengthwise of the chamber and discharging lengthwise thereof.

12. In an evaporating apparatus, an elongated chamber, means for introducing an atomized fluid into the chamber, and means for propelling the atomized fluid lengthwise of the chamber consisting of a plurality of air discharging nozzles discharging lengthwise of the chamber, and discharge nozzles for blowing the atomized fluid toward said first named nozzles.

13. In an evaporating apparatus, an elongated chamber, means for introducing an atomized fluid into the chamber, means for propelling the atomized fluid lengthwise of the chamber and means for blowing the atomized fluid in a direction opposite to that given by said propelling means.

14. In an evaporating apparatus, an elongated trough-shaped chamber having an open top obstructed by a foraminous material, means for introducing an atomized fluid into one end of the said chamber, and air-discharging nozzles arranged at different points lengthwise of the chamber discharging obliquely across the same toward the said foraminous material.

15. In an evaporating apparatus, an elongated trough-shaped chamber having an open top obstructed by a foraminous material, means for introducing an atomized fluid into one end of the said chamber, and air discharging nozzles arranged at different points lengthwise of the chamber discharging obliquely across the same toward the said foraminous material, and means for electrically charging the particles in the atomized fluid.

16. In an evaporating apparatus, a chamber having one end open, a cover of foraminous material over said opening, means to force a current of air through said chamber toward said cover, means to supply atomized fluid to said air current and means for charging electrically the particles in the atomized fluid, said cover being supported to be moved past said opening.

17. In an evaporating apparatus, a chamber having one end open, a cover of foraminous material over said opening, means to force a current of air through said chamber toward said cover, means to supply atomized fluid to said air current and means for charging electrically the air in said current with one polarity and said covering with the opposite polarity, said cover being supported to be moved past said opening.

18. In an evaporating apparatus, an elongated chamber, a receiving chamber into which the first chamber opens, means for introducing an atomized fluid in one end of the elongated chamber, and air discharging inlets arranged at different points in the elongated chamber lengthwise thereof and having their inlets discharging toward the receiving chamber to propel the atomized fluid through the elongated chamber into the receiving chamber.

19. In an evaporating apparatus, an elongated chamber, a receiving chamber into which the first chamber opens, means for introducing an atomized fluid in one end of the elongated chamber, and air discharging inlets arranged at different points in the elongated chamber lengthwise thereof and having their inlets discharging toward the receiving chamber to propel the atomized fluid through the elongated chamber into the receiving chamber, and air inlets in the receiving chamber extending longitudinally thereof.

20. In an evaporating apparatus, an elongated chamber, a receiving chamber into which the first chamber opens, means for introducing an atomized fluid in one end of the elongated chamber, and air discharging inlets arranged at different points in the elongated chamber lengthwise thereof and having their inlets discharging toward the receiving chamber to propel the atomized fluid through the elongated chamber into the receiving chamber, an air jacket about the said chambers, said inlets communicating with said jacket.

21. In an evaporating apparatus, a chamber, means for delivering an atomized fluid into the chamber, and means for giving successive impulses to the fluid to cause it to progress through the chamber.

22. In an evaporating apparatus, a chamber, means for delivering an atomized fluid into the chamber and means for delivering heated gas to the chamber, arranged to give successive impulses to the fluid to cause it to progress through the chamber.

23. In an evaporating apparatus, a chamber, means for delivering an atomized fluid into the chamber, a series of jets and means for supplying a heated gas to the jets, said jets being arranged in series in the chamber, so that the heated air from each jet will carry the fluid into the heated air from the succeeding jet.

24. In an evaporating apparatus, a chamber, a screen closing one side of the same, means for delivering an atomized fluid into the chamber, a series of jet devices for propelling the drying substance through the chamber, and electrical connections whereby the air discharged from the said devices is given one polarity and the screen an opposite polarity.

25. In an evaporating apparatus, a chamber, an endless screen closing one side of the same, means for delivering an atomized fluid into the chamber, a plurality of jet devices for propelling the drying substance through the chamber, and electrical connections whereby the air discharged from the said devices is given one polarity and the screen an opposite polarity.

26. In an evaporating apparatus, a chamber, a screen closing one side thereof, means for delivering an atomized fluid to said chamber, means for delivering a current of air to said chamber and electrical connections constructed and arranged to give the air one polarity and the screen the opposite polarity, said screen being supported to be moved past said opening.

27. In an evaporating apparatus, a chamber, a screen closing one side of the same, means for delivering an atomized fluid into the chamber, a plurality of jet devices for propelling the drying substance through the chamber, and electrical connections whereby the air discharged from the said devices is given one polarity, and the screen an opposite polarity, and means for removing substances intercepted by the screen.

28. In an evaporating apparatus, a chamber, an endless screen closing one side of the same, means for delivering an atomized fluid into the chamber, a plurality of jet devices for propelling the drying substance through the chamber, and electrical connections whereby the air discharged from the said devices is given one polarity, and the screens an opposite polarity, and means for removing substances intercepted by the screen.

29. In an evaporating apparatus, an elongated chamber, a jacket about the chamber, means for supplying air to the air jacket, a plurality of transverse slits in the chamber parallel to each other and discharging across and obliquely of the chamber, said slits communicating with the jacket, and means for introducing a spray of the liquid to be evaporated into the chamber.

30. In an evaporating apparatus, a cylindrical chamber, means to force from a plurality of points in the walls thereof, a current of air around the interior of the chamber and along the walls thereof, and means to supply fluid to be evaporated to the current of air.

31. In an evaporating apparatus, a chamber having openings in the walls thereof, means for forcing a current of air through said openings, said openings being arranged to throw said air current along the walls of said chamber and means for sending a stream of the liquid to be evaporated into the current of air.

32. In an evaporating apparatus, a chamber, means for sending into said chamber a stream of the fluid to be evaporated and means to produce a current of air between the stream of fluid and the walls of said chamber, to prevent the fluid from touching said walls.

33. In an evaporating apparatus, means to throw a horizontal stream of atomized fluid and means to throw a plurality of streams of gas in succession under the stream of fluid to support it.

34. In an evaporating apparatus, means to throw a horizontal stream of atomized fluid and means to throw a plurality of streams of gas in succession under the stream of fluid and parallel therewith to support it.

35. In an evaporating apparatus, means to throw a horizontal stream of atomized fluid and means to throw a plurality of streams of gas in succession under the stream of fluid and parallel with and in the direction of travel of the stream of fluid.

36. In an evaporating apparatus, means to throw a horizontal stream of atomized fluid and means to throw a plurality of streams of gas from a plurality of adjacent points under the stream of fluid to support it.

37. An evaporating apparatus comprising a chamber, means to throw horizontally through said chamber, a stream of the fluid to be evaporated and means to project beneath the stream of fluid a stream of heated gas to support and dry said fluid.

38. An evaporating apparatus comprising a chamber, means to throw horizontally through said chamber, a stream of the fluid to be evaporated and means to project beneath the stream of fluid a stream of heated gas to support and dry said fluid, said last named means being constructed and arranged to cause the stream of gas to support the stream of fluid continuously as it progresses through said chamber.

In testimony whereof I have hereunto signed my name in the presence of two subscribing witnesses.

JOHN H. FEDELER.

Witnesses:
M. E. McNinch,
C. G. Heylinung.